United States Patent
Hong et al.

(10) Patent No.: US 10,430,353 B2
(45) Date of Patent: Oct. 1, 2019

(54) MEMORY DEVICE PERFORMING NEAR-DATA PROCESSING USING A PLURALITY OF DATA PROCESSING ENGINES THAT INDEPENDENTLY PERFORM DATA PROCESSING OPERATIONS, AND SYSTEM INCLUDING THE SAME

(71) Applicants: SK hynix Inc., Icheon (KR); Korea Advanced Institute of Science and Technology, Daejeon (KR)

(72) Inventors: Byungchul Hong, Seoul (KR); John Dongjun Kim, Seoul (KR); Jungho Ahn, Seoul (KR); Yongkee Kwon, Seoul (KR); Hongsik Kim, Seongnam (KR)

(73) Assignees: SK hynix Inc., Icheon (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 104 days.

(21) Appl. No.: 15/655,671

(22) Filed: Jul. 20, 2017

(65) Prior Publication Data

US 2018/0173654 A1 Jun. 21, 2018

(30) Foreign Application Priority Data

Dec. 16, 2016 (KR) .................. 10-2016-0172241

(51) Int. Cl.
*G06F 13/10* (2006.01)
*G06F 13/16* (2006.01)
*G06F 12/1009* (2016.01)

(52) U.S. Cl.
CPC ...... *G06F 13/1673* (2013.01); *G06F 12/1009* (2013.01); *G06F 13/102* (2013.01); *G06F 2212/154* (2013.01); *G06F 2212/65* (2013.01)

(58) Field of Classification Search
CPC ............... G06F 13/1673; G06F 13/102; G06F 12/1009; G06F 2212/154; G06F 2212/65; G06F 12/0246
See application file for complete search history.

(56) References Cited

U.S. PATENT DOCUMENTS

| 9,286,948 B2 | 3/2016 | Loh et al. | |
| 2003/0051099 A1* | 3/2003 | Yoaz | G06F 9/3824 711/118 |

(Continued)

FOREIGN PATENT DOCUMENTS

KR 10-2015-0028520 A 3/2015

OTHER PUBLICATIONS

Byungchul Hong et al., "Accelerating Linked-list Traversal Through Near-Data Processing," PACT, Sep. 11-15, 2016, pp. 113-124, ACM.

(Continued)

*Primary Examiner* — Tasnima Matin

(57) ABSTRACT

A memory device includes a memory cell region including a plurality of memory cells; a memory cell controller configured to control read and write operation for the memory cell region; one or more NDP engines configured to perform a near data processing (NDP) operation for the memory cell region; a command buffer configured to store an NDP command transmitted from a host; and an engine scheduler configured to schedule the NDP operation for the one or more NDP engines according to the NDP command.

20 Claims, 8 Drawing Sheets

(56) References Cited

U.S. PATENT DOCUMENTS

| | | | | |
|---|---|---|---|---|
| 2007/0162715 | A1* | 7/2007 | Tagawa | G06F 13/1647 711/158 |
| 2008/0127131 | A1* | 5/2008 | Gao | G06F 8/4442 717/140 |
| 2012/0036512 | A1* | 2/2012 | Chung | G06F 9/4881 718/103 |
| 2014/0149464 | A1 | 5/2014 | Kahle et al. | |
| 2014/0189252 | A1* | 7/2014 | Biswas | G06F 12/0884 711/142 |
| 2017/0255397 | A1* | 9/2017 | Jayasena | G06F 12/10 |
| 2018/0173654 | A1* | 6/2018 | Hong | G06F 13/1673 |

OTHER PUBLICATIONS

Jung Ho Ahn et al., "Scatter-Add in Data Parallel Architectures," HPCA-11, 2005, pp. 132-142, IEEE.

Jung Ho Ahn et al., "McSimA+: A Manycore Simulator with Application-level+ Simulation Detailed and Microarchitecture Modeling," ISPASS, 2013, pp. 74-85.

Junwhan Ahn et al., "A Scalable Processing-in-Memory Accelerator for Parallel Graph Processing," ISCA, Jun. 13-17, 2015, pp. 105-117, ACM.

Berkin Akin et al., "Data Reorganization in Memory Using 3D-stacked DRAM," ISCA, Jun. 13-17, 2015, pp. 131-143, ACM.

Berk Atikoglu et al., "Workload Analysis of a Large-Scale Key-Value Store," ACM SIGMETRICS, Jun. 11-15, 2012, pp. 53-64, ACM.

Rajeev Balasubramonian et al., "Near-Data Processing: Insights from a MICRO-46 Workshop," IEEE Micro, 2014, pp. 36-42, vol. 34, No. 4, IEEE.

James Balfour et al., "Design Tradeoffs for Tiled CMP On-Chip Networks," ICS, Jun. 28-30, 2006, pp. 187-198, ACM.

Cagri Balkesen et al., "Main-Memory Hash Joins on Multi-Core CPUs: Tuning to the Underlying Hardware," ICDE, 2013, pp. 362-373.

Arkaprava Basu et al., "Efficient Virtual Memory for Big Memory Servers," ISCA, 2013, pp. 237-248, ACM.

Nathan Binkert et al., "The gem5 Simulator," SIGARCH Comput. Archit. News, 2011, pp. 1-7, vol. 39, No. 2.

Spyros Blanas et al., "Design and Evaluation of Main Memory Hash Join Algorithms for Multi-core CPUs," International Conference on Management of data (SIGMOD), Jun. 12-16, 2011, pp. 37-48, ACM.

John Carter et al., "Impulse: Building a Smarter Memory Controller," HPCA, 1999, pp. 1-23.

Ke Chen et al., "CACTI-3DD: Architecture-level Modeling for 3D Die-stacked DRAM Main Memory," Date, 2012, pp. 33-38.

Paul Dlugosch et al., "An Efficient and Scalable Semiconductor Architecture for Parallel Automata Processing," IEEE Transactions on Parallel and Distributed Systems, Dec. 2014, vol. 25, No. 12, pp. 3088-3098, IEEE.

Babak Falsafi et al., "A Primer on Hardware Prefetching," Synthesis Lectures on Computer Architecture, 2014, pp. 1-67, vol. 9, No. 1, Morgan&Claypool Publishers.

Zhen Fang et al., "Active Memory Operations," ICS, Jun. 18-20, 2007, pp. 232-241, ACM.

Brad Fitzpatrick et al., "Memcached: a distributed memory object caching system," 2003. Available: https://memcached.org/.

Mingyu Gao et al., "Practical Near-Data Processing for In-memory Analytics Frameworks," PACT, 2015, pp. 113-124, IEEE.

Mingyu Gao et al., "HRL: Efficient and Flexible Reconfigurable Logic for Near-Data Processing," HPCA, 2016, pp. 126-137, IEEE.

Qi Guo et al., "3D-Stacked Memory-Side Acceleration: Accelerator and System Design," the Workshop on Near-Data Processing (WoNDP), 2014. pp. 1-6.

Anthony Gutierrez et al., "Integrated 3D-Stacked Server Designs for Increasing Physical Density of Key-Value Stores," ASPLOS, Mar. 1-4, 2014, pp. 485-498, ACM.

Tayler H. Hetherington et al., "Characterizing and Evaluating a Key-value Store Application on Heterogeneous CPU-GPU Systems," ISPASS, Apr. 2012, pp. 88-98.

Byungchul Hong et al., "Adaptive and Flexible Key-Value Stores Through Soft Data Partitioning," ICCD, 2016, pp. 296-303, IEEE.

"Hybrid Memory Cube Specification 2.0," 2014, pp. 1-125, Hybrid Memory Cube Consortium.

Ashish Jha et al., "Increasing Memory Throughput With Intel Streaming SIMD Extensions 4 (Intel SSE4) Streaming Load," White Paper, Apr. 2007, pp. 1-7.

"Intel 64 and IA-32 Architectures Software Developer's Manual," Sep. 2014, pp. 1-3439, vols. 1. 2A, 2B, 2C,3A, 3B and 3C, Intel.

"Intel Virtualization Technology for Directed I/O," Architecture Specification, Jun. 2016, pp. 1-271, Intel.

Joe Jeddeloh et al., "Hybrid Memory Cube New DRAM Architecture Increases Density and Performance," Symposium on VLSI Technology Digest of Technical Papers, 2012, pp. 87-88, IEEE.

Nan Jiang et al., "A Detailed and Flexible Cycle-Accurate Network-on-Chip Simulator," ISPASS, 2013, pp. 86-96.

Yi Kang et al., "FlexRAM: Toward an Advanced Intelligent Memory System," ICCD, 2012, pp. 5-14, IEEE.

Gwangsun Kim et al., "Memory-centric System Interconnect Design with Hybrid Memory Cubes," PACT, 2013, pp. 145-155, IEEE.

Hyojong Kim et al., "Understanding Energy Aspects of Processing-near-Memory for HPC Workloads," Proceedings of the 2015 International Symposium on Memory Systems, Oct. 5-8, 2015, pp. 276-282, ACM.

Onur Kocberber et al., "Meet the Walkers: Accelerating Index Traversals for In-Memory Databases," MICRO, Dec. 7-11, 2013, pp. 1-12, ACM.

Peter M. Kogge, "Execube—A New Architecture for Scaleable MPPS," ICPP, 1994, pp. 77-84, IEEE.

Joo Hwan Lee et al., "BSSync: Processing Near Memory for Machine Learning Workloads with Bounded Staleness Consistency Models," PACT, 2015, pp. 241-252, IEEE.

Sheng Li et al., "McPAT: an Integrated Power, Area, and Timing Modeling Framework for Multicore and Manycore Architectures," MICRO, Dec. 12-16, 2009, pp. 469-480, ACM.

Gabriel H. Loh, "A Register-file Approach for Row Buffer Caches in Die-stacked DRAMs," MICRO, Dec. 3-7, 2011, pp. 351-361, ACM.

Gabriel H. Loh et al., "A Processing-in-Memory Taxonomy and a Case for Studying PIM," Workshop on Near-Data Processing (WoNDP), 2013, pp. 1-4.

Richard C. Murphy et al., "Introducing the Graph 500," Cray User's Group (CUG), May 5, 2010, pp. 1-5.

Lifeng Nai et al., "Instruction Offloading with HMC 2.0 Standard: A Case Study for Graph Traversals," Proceedings of the 2015 International Symposium on Memory Systems, Oct. 5-8, 2015, pp. 258-261, ACM.

Ravi Nair et al., "Active Memory Cube: A processing-in-memory architecture for exascale systems," IBM Journal of Research and Development, 2015, pp. vol. 59, No. 2/3, Paper 17, pp. 1-14.

David Patterson et al., "A Case for Intelligent RAM: IRAM," Micro, Apr. 1997, pp. 1-23, DOI: 10.1109/40.592312, IEEE.

J. Thomas Pawlowski, "Hybrid Memory Cube (HMC)," Hot Chips, Aug. 4, 2011, pp. 1-24, Micron Technology, Inc.

Seth H. Pugsley et al., "NDC: Analyzing the Impact of 3D-Stacked Memory-+ Logic Devices on MapReduce Workloads," ISPASS, 2014, pp. 190-200.

Samsung, "Samsung announces IMDB memory." May 22, 2015, [Online]. Available: http://www.techeye.net/business/samsung-announces-imdb-memory-with-ndp-hbm-too.

Gurtej Sandhu, "DRAM Scaling and Bandwidth Challenges," NSF Workshop on Emerging Technologies for Interconnects (WETI), 2012, pp. 1-23, Micron Technology Inc.

Avinash Sodani et al., "Knights Landing: Second-Generation Intel Xeon Phi Product," IEEE Micro, 2016, vol. 36, No. 2, pp. 34-46, IEEE.

(56) References Cited

OTHER PUBLICATIONS

Craig B. Zilles, "Benchmark Health Considered Harmful," ACM SIGARCH Computer Architecture News, 2001, pp. 4-5, vol. 29, No. 3, ACM.

* cited by examiner

MEMORY DEVICE PERFORMING NEAR-DATA PROCESSING USING A PLURALITY OF DATA PROCESSING ENGINES THAT INDEPENDENTLY PERFORM DATA PROCESSING OPERATIONS, AND SYSTEM INCLUDING THE SAME

CROSS-REFERENCE TO RELATED APPLICATIONS

The present application claims priority to Korean Patent Application No. 10-2016-0172241, filed on Dec. 16, 2016, which is incorporated herein by reference in its entirety.

BACKGROUND

1. Field

Exemplary embodiments of the present disclosure relate to memory devices for performing near-data processing (NDP), and systems including the memory devices.

2. Description of the Related Art

In conventional computer systems, data is stored in a memory device, and a processor reads the data from the memory device and processes the data.

In such a computer system, there is a limit to improving the performance of the computer system because a bandwidth usable for communications between the memory device and the processor is restricted.

SUMMARY

Various embodiments of the present disclosure are directed to a memory device for performing near-data processing (NDP) to improve NDP performance, and a system including the same.

Various embodiments of the present disclosure are directed to a new configuration of a memory device that can efficiently perform an NDP operation.

Various embodiments of the present disclosure are directed to a memory device that can efficiently perform a linked list traversal, and a system including the same.

A memory device according to an embodiment may include a memory cell region including a plurality of memory cells; a memory cell controller configured to control read and write operation for the memory cell region; one or more NDP engines configured to perform a near data processing (NDP) operation for the memory cell region; a command buffer configured to store an NDP command transmitted from a host; and an engine scheduler configured to schedule the NDP operation for the one or more NDP engines according to the NDP command.

A memory device according to an embodiment may include a plurality of memory vaults each comprising a plurality of memory cells and a memory cell controller configured to control read and write operations for the plurality of memory cells; a plurality of NDP engines configured to perform a near data processing (NDP) operation for the plurality of memory vaults; a command buffer configured to store an NDP command transmitted from a host; an engine scheduler configured to schedule the NDP operation for the plurality of NDP engines according to the NDP command; and an internal memory network configured to connect the plurality of NDP engines to the command buffer, wherein each of the plurality of NDP engines is configured to send a read and write request directly to a corresponding one of the plurality of memory vaults that is coupled to said each of the plurality of NDP engines, or to send a read and write request to one of the other memory vaults than the corresponding memory vault via the internal memory network.

A system according to an embodiment may include a plurality of memory devices; and a host configured to provide an NDP command to one of the plurality of memory devices, wherein each of the plurality of memory devices may comprise a plurality of memory vaults each comprising a plurality of memory cells and a memory cell controller configured to control read and write operations for the plurality of memory cells; a plurality of NDP engines configured to perform a near data processing (NDP) operation for the plurality of memory vaults; a command buffer configured to store the NDP command transmitted from the host; an engine scheduler configured to schedule the NDP operation for the plurality of NDP engines according to the NDP command; and an internal memory network configured to connect the plurality of NDP engines to the command buffer, wherein each of the plurality of NDP engines is coupled to one of the plurality of memory vaults and configured to send a read and write request to a different one of the plurality of memory vaults without passing through the internal memory network or to send a read and/or write request to the other of the plurality of memory vaults via the internal memory network.

DETAILED DESCRIPTION

Figure 1:
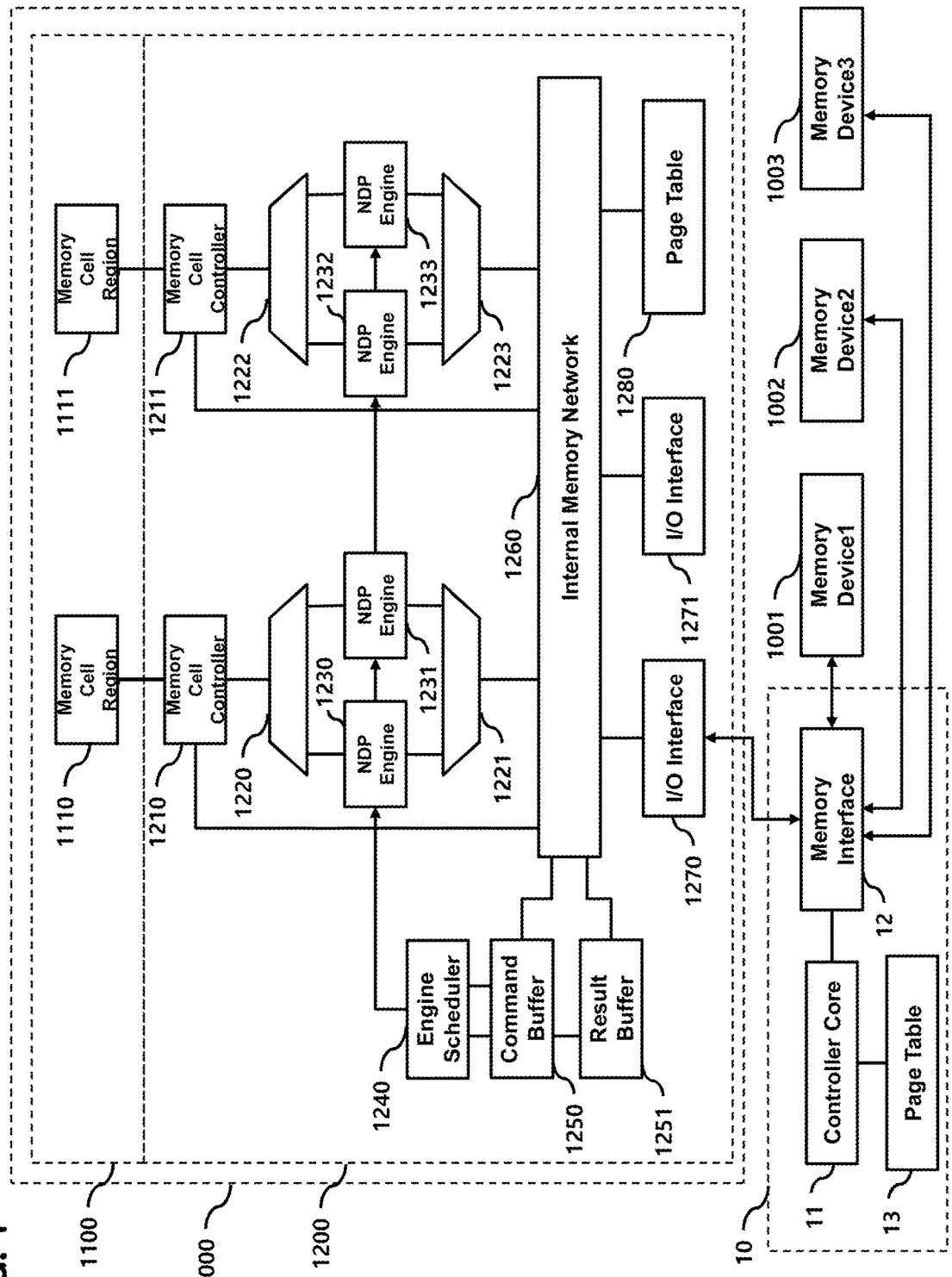
FIG. 1 illustrates a system in accordance with an embodiment of the present disclosure.

Various embodiments will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of embodiments of the claims to those skilled in the art. Throughout the disclosure, like reference numerals refer to like parts throughout the various figures and embodiments of the present disclosure.

Hereinafter, embodiments will be described with reference to the accompanying drawings.

FIG. 1 illustrates a system according to an embodiment of the present disclosure.

The system of FIG. 1 includes a host 10 and a plurality of memory devices 1000 to 1003.

The plurality of memory devices 1000 to 1003 each have substantially the same structure.

The host 10 provides NDP commands to the plurality of memory devices 1000 to 1003. Each of the plurality of memory devices 1000 to 1003 performs an NDP operation in accordance with an NDP command transmitted from the host 10, and sends the result to the host 10.

The host 10 controls the memory devices 1000 to 1003, and includes any of a CPU, a memory controller, and the like.

In this embodiment, the host 10 includes a controller core 11 and a memory interface 12.

The controller core 11 generates NDP commands, which are to be provided to the plurality of memory devices 1000 to 1003.

The memory interface 12 mediates the input/output (I/O) of NDP commands and NDP results between the plurality of memory devices 1000 to 1003 and the controller core 11.

In this embodiment, an NDP command may have a packet structure. The packet structure of the NDP command will be described in detail below with reference to FIG. 2.

The host 10 may further include a page table 13. The page table 13 stores information on a mapping relationship between logical addresses requested by the host 10 and physical addresses of each of the memory devices 1000 to 1003. The mapping relationship may be managed by the controller core 11. The information on the mapping relationship may be referred to as "mapping information."

In this embodiment, the memory device 1000 may have a three-dimensional stack structure.

The memory device 1000 includes a memory cell layer 1100 and a logic layer 1200, and the memory cell layer 1100 may have a multi-layer structure.

The memory cell layer 1100 and the logic layer 1200 may be connected to each other by a Through Silicon Via (TSV).

In this embodiment, the memory device 1000 may include a plurality of memory vaults such as a Hybrid Memory Cube (HMC).

It can be understood from FIG. 1 that a single memory vault may include a memory cell region and a memory cell controller. FIG. 1 shows two memory vaults. A first memory vault includes a memory cell region 1110 and a memory cell controller 1210, and a second memory vault includes a memory cell region 1111 and a memory cell controller 1211. Each of the memory cell regions 1110 and 1111 may include a plurality of memory cells.

Although two memory vaults are shown in FIG. 1, a person skilled in the art may easily recognize that a memory device includes more than two memory vaults.

Although FIG. 1 shows that the plurality of memory devices 1000 to 1003 are individually connected to the memory interface 12 of the host 10, the plurality of memory devices 1000 to 1003 may communicate with each other via a memory network. Thus, the plurality of memory devices 1000 to 1003 can transmit and receive packet data to and from each other via the memory network.

Accordingly, an NDP command transmitted from the host 10 may be directly applied to a memory device, or may be input to a memory device via another memory device connected through the memory network.

Hereinafter, a configuration of the logic layer 1200 for receiving an NDP command and controlling an NDP operation will be described in more detail.

The logic layer 1200 includes the memory cell controllers 1210 and 1211, first and second path selectors 1220 to 1223, NDP engines 1230 to 1233, an engine scheduler 1240, a command buffer 1250, a result buffer 1251, an internal memory network 1260, and I/O interfaces 1270 and 1271. The logic layer 1200 may further include a page table 1280.

The memory cell controllers 1210 and 1211 included in the first and second memory vaults control read or write operations of the corresponding memory cell regions 1110 and 1111 in the first and second memory vaults, respectively.

The NDP engines 1230 to 1233 control NDP operations in accordance with NDP commands from the engine scheduler 1240.

The NDP engines 1230 and 1231 request the memory cell controller 1210 to read or write data from or to the memory cell region 1110 to perform an NDP operation.

The first path selector 1220 selectively transfers requests of the NDP engines 1230 and 1231 to the memory cell controller 1210.

The second path selector 1221 selectively connects the NDP engines 1230 and 1231 to the internal memory network 1260.

The selected NDP engine of the NDP engines 1230 and 1231 sends and receives signals to and from the command buffer 1250 or the result buffer 1251 via the internal memory network 1260.

The NDP engines 1232 and 1233 request the memory cell controller 1211 to read or write data from or to the memory cell region 1111 to perform an NDP operation.

The first path selector 1222 selectively transmits requests of the NDP engines 1232 and 1233 to the memory cell controller 1211.

The second path selector 1223 selectively connects the NDP engines 1232 and 1233 to the internal memory network 1260.

The selected NDP engine of the NDP engines 1232 and 1233 sends and receives signals to and from the command buffer 1250 or the result buffer 1251 via the internal memory network 1260.

In FIG. 1, two NDP engines are allocated to each memory vault, but the number of the NDP engines allocated to each memory vault may vary according to embodiments. For example, the NDP engines 1230 and 1231 are allocated to the first memory vault, which includes the memory cell region 1110 and the memory cell controller 1210, and the NDP engines 1232 and 1233 are allocated to the second memory vault, which includes the memory cell region 1111 and the memory cell controller 1211.

Each NDP engine can independently perform an NDP operation for a corresponding memory cell region.

However, the NDP engines 1230 and 1231 allocated to the first memory vault may access the memory cell region 1111 in the second memory vault as well as the memory cell region 1110 in the first memory vault during an NDP operation.

Similarly, the NDP engines 1232 and 1233 in the second memory vault may access the memory cell region 1110 in the first memory vault as well as the memory cell region 1111 region in the second memory vault during an NDP operation.

When the NDP engines 1230 and 1231 allocated to the first memory vault access the memory cell region 1111 in the second memory vault, data processing may be delayed since a read or write request from the NDP engines 1230 and 1231 is transmitted to the memory cell controller 1211 in the second memory vault through the internal memory network 1260.

In some cases, the NDP engine in the memory device 1000 may request a read or write operation to memory cell regions included in the other memory devices 1001 to 1003. In this case, the read or write request may be transmitted through an external memory network as well as the internal memory network 1260. Therefore, the data processing may be further delayed.

Therefore, it is advantageous that data necessary for an NDP operation are stored in the same memory device, and it is more advantageous that the data are stored in the same memory vault in a memory device.

For example, if an NDP operation is a linked list traversal, it is advantageous that all data in the linked list are stored in the same memory vault.

The page table 1280 in the memory device 1000 stores information on a mapping relationship between logical addresses requested by the host 10 and physical addresses of the memory cell regions 1110 and 1111 included in the memory device 1000 and memory cell regions included in the other memory devices 1001 to 1003.

In the present embodiment, a logical address and a physical address may represent a logical address and a physical address of a data structure (for example, a linked list), which is an object or a target of an NDP operation.

The page table 13 of the host 10 stores mapping information of logical addresses and physical addresses for all data structures managed by the host 10.

In an embodiment, the page table 1280 of the memory device 1000 may store entire mapping information in the page table 13 of the host 10.

In another embodiment, the page table 1280 of the memory device 1000 may store mapping information related to memory cell regions in the memory device 1000. For example, the page table 1280 of the memory device 1000 may store mapping information between a logical address and a physical address for a data structure in the memory device 1000. The page table 1280 may further store mapping information between a logical address and a physical address of another memory device when the other memory device stores a part of the data structure stored in the memory device 1000.

The memory device 1000 includes the page table 1280, thereby reducing the need to access the host 10 every time to confirm a physical address during an NDP operation.

The host 10 may refer to the page table 13 in a process of storing a linked list so that logical addresses of data included in the linked list are allocated to physical addresses of memory cell regions in the same memory vault.

The host 10 can allocate one or more logical addresses of data included in the linked list to physical addresses of a memory cell region in another memory vault in the same memory device if there is no free space in the memory cell region in the same memory vault, and also can assign one or more logical addresses of data included in the linked list to physical addresses of memory cell regions in another memory device only when there is no free space in the same memory device.

In this way, since data of the linked list are stored to be adjacent to each other, a data read speed of an NDP operation is improved, thereby improving the overall processing speed.

The command buffer 1250 stores NDP commands provided by the host 10.

As described above, in this embodiment, an NDP command provided by the host 10 has a packet structure.

The NDP command is generated in the controller core 11, and is input to the I/O interface 1270 of the memory device 1000 via the memory interface 12.

The NDP command input to the I/O interface 1270 is transferred to the command buffer 1250 via the internal memory network 1260, and stored in the command buffer 1250.

The engine scheduler 1240 monitors the command buffer 1250 and the result buffer 1251, and allocates unprocessed NDP commands to the NDP engines 1230 to 1233.

At this time, contents of an NDP command may be transferred to an NDP engine through the engine scheduler 1240. In another embodiment, an NDP engine receiving an instruction may read the NDP command directly from the command buffer 1250 through the internal memory network 1260.

In this embodiment, addresses of the command buffer 1250 may be in one-one correspondence with addresses of the result buffer 1251.

Accordingly, when an NDP command is stored in an n-th index of the command buffer 1250, its NDP result can be stored in an n-th index of the result buffer 1251, n being an integer greater than or equal to 0.

In this case, the engine scheduler 1240 may monitor the command buffer 1250 and the result buffer 1251 to schedule NDP commands and send NDP results to the host 10.

The engine scheduler 1240 sends an NDP command to any one of the NDP engines 1230 to 1233, so that the NDP engine receiving the NDP command performs an NDP operation. That is, the NDP engine receiving the NDP command commands the NDP operation in response to the NDP command from the engine scheduler 1240. At this time, information on an index of the command buffer 1250 storing the NDP command can be transmitted to the NDP engine together with the NDP command.

For example, the engine scheduler 1240 selects the memory cell region 1110 or 1111 that is likely to store a data structure associated with a particular NDP command, selects an NDP engine that is in an idle state among NDP engines directly coupled to the selected memory cell region, and assigns the particular NDP command to the selected NDP engine.

The engine scheduler 1240 may refer to the page table 1280 when selecting a memory cell region that is likely to store the data structure associated with the particular NDP command with offset information of the NDP command described with reference to FIG. 2.

The NDP engine 1230 or 1231 in the memory device 1000 performs an NDP operation and stores the NDP result in the corresponding index of the result buffer 1251.

The engine scheduler 1240 can remove an NDP command from the command buffer 1250 when an NDP operation of the NDP command is indicated by the result buffer 1251 as being completed, and output the NDP result stored in the result buffer 1251 to the host 10.

The host 10 may send an NDP command to the memory device 1000, and then may send a read command to the memory device 1000 to read the NDP result from the memory device 1000. In response to the read command, the memory device 1000 may send the NDP result stored in the result buffer 1251 to the host 10.

The host 10 can specify an index of the command buffer 1250 in which the NDP command is to be stored. The host 10 may then provide the read command for the same index as the index of the command buffer 1250 to the result buffer 1251, and may read the NDP result of the NDP command from the result buffer 1251. The NDP result is stored in an index of the result buffer 1251 that is the same as the index of the command buffer 1250 in which the NDP command is stored.

In the following disclosure, embodiments are described in relation to an NDP operation such as a linked list traversal.

Figure 2:
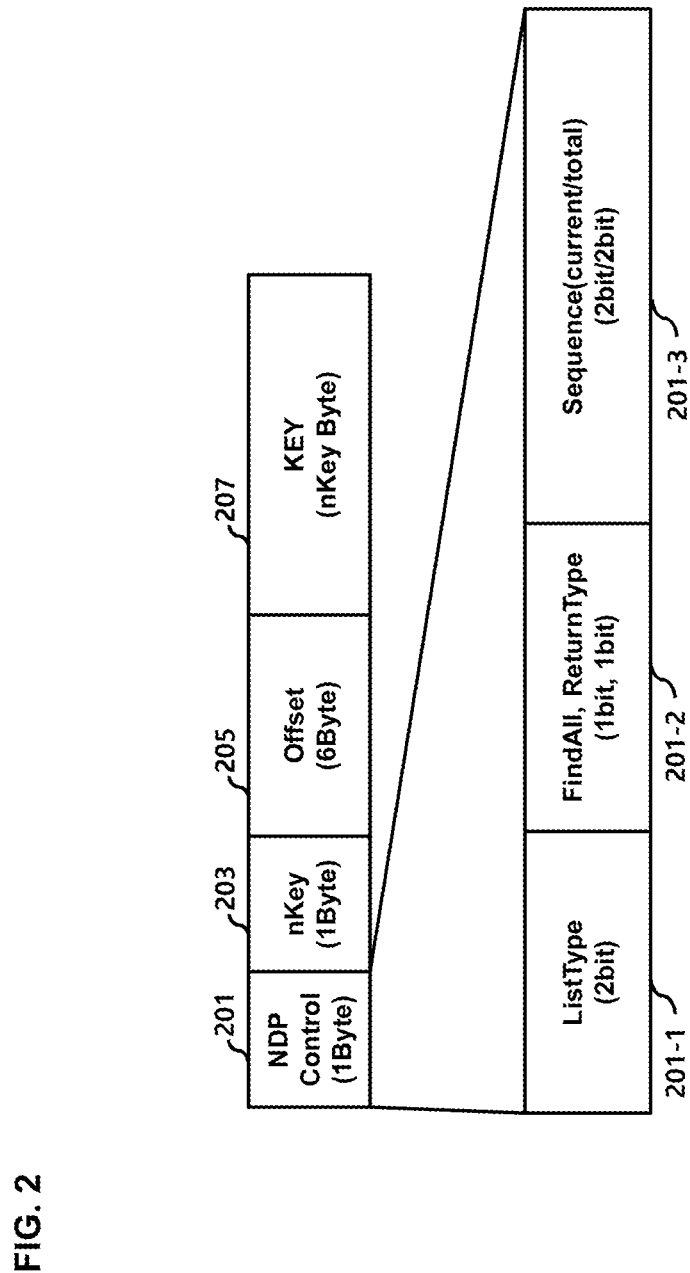
FIG. 2 illustrates a packet structure of an NDP command in accordance with an embodiment of the present disclosure.

FIG. 2 illustrates a packet structure of an NDP command in accordance with an embodiment.

As shown in FIG. 2, the NDP command packet includes a 1-byte NDP control field 201, a 1-byte nKey field 203, a 6-byte offset field 205, and a KEY field 207. The KEY field 207 includes a key having a length that is equal to a number stored in the nKey field 203.

The NDP control field 201 includes a 2-bit list type field 201-1, a 2-bit control field 201-2, and a 4-bit sequence field 201-3.

In FIG. 2, the nKey field 203 includes the number indicating the length of the key included in the KEY field 207 in bytes.

In this embodiment, the key has the nKey byte length, and includes information indicating an item to be searched in a linked list.

For example, if the number of the nKey field 203 is 1, the KEY field 207 of the NDP command stores 1 byte information. If the number of the nKey field 203 is 2, the KEY field 207 of the NDP command stores 2-byte information.

In the present embodiment, when the number of the nKey field 203 is 0, the KEY field 207 has a length of 0 byte. In this case, it is understood that the NDP command instructs to read all nodes in the linked list when the linked list includes a plurality of nodes.

Information in the offset field 205 is used to derive a start address of the linked list to be traversed in combination with information on a base address.

At this time, the base address may be stored in a setting register (not shown) of the memory device 1000 in advance.

For example, when the base address is "1000" and the offset information is "100," an NDP engine confirms a physical address corresponding to a logical address "1100" from the page table 1280 and starts to traverse the linked list from the corresponding physical address, the logical address "1100" being obtained by combining the base address "1000" and the offset information "100".

Figure 3:
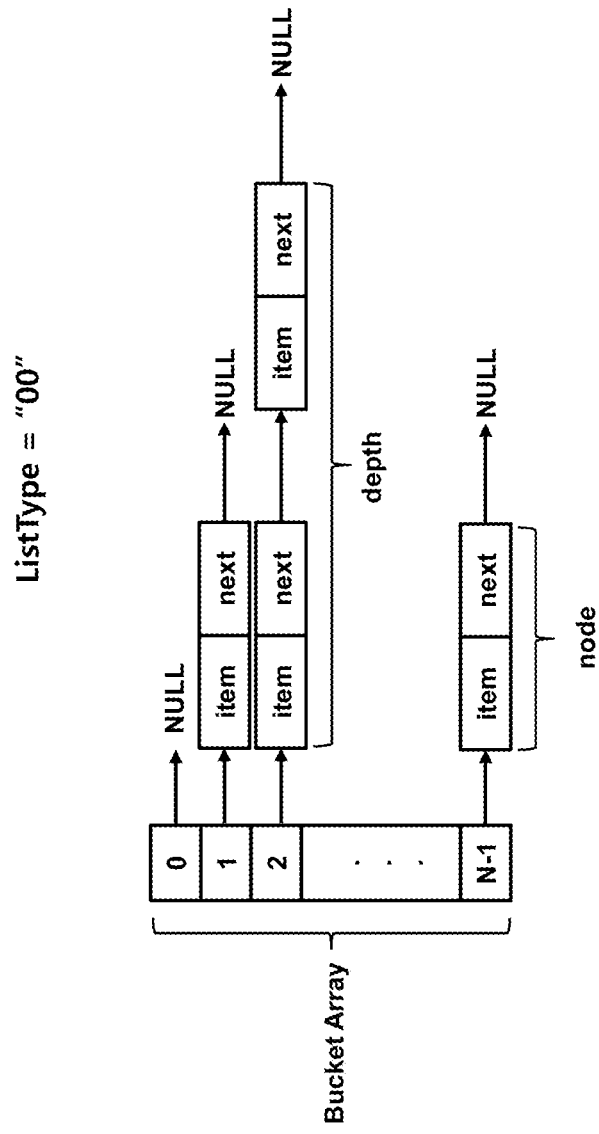
FIGS. 3, 4, 5, and 6 illustrate data structures of linked lists processed in an NDP engine of FIG. 1 in accordance with embodiments of the present disclosure.

For example, when managing a plurality of linked lists using a bucket array as shown in FIG. 3, it can be understood that the base address corresponds to a logical address indicating a 0th index of the bucket array, and the offset information corresponds to the index value.

Referring back to FIG. 2, the control field 201-2 of the NDP control field 201 stores two pieces of information, each of which has 1 bit.

The first piece of information is FindAll information indicating whether to read all nodes when traversing the linked list, and the second piece of information is Return-Type information for determining a type of a return value.

For example, if the FindAll information is 1, information of all the nodes in the linked list is output; otherwise, information of the first node corresponding to the key is output.

For example, if the ReturnType information is 1, an address of a node is output; otherwise, a value of the node is output.

The sequence field 201-3 of the NDP control field 201 is used to determine an order of packets. For example, when one NDP command is divided into four packets and output, the sequence fields 201-3 in the four packets may have values of "0011," "0111," "1011," and "1111," respectively.

If the four packets do not arrive in order, the four packets can be combined in order by referring to information in the sequence fields 201-3 of the four packets.

When the NDP command is divided into the four packets, e.g., 0th to 3rd packets, the NDP control field 201 is commonly included in the 0th to 3rd packets, the nKey field 203 and the offset field 205 are present only in the 0th packet, and the information of the KEY field 207 may be divided into the 0th to 3rd packets.

In this embodiment, when the length of the NDP command is shorter than a length of one packet, it is possible to transmit a plurality of NDP commands using one packet.

Accordingly, in an embodiment, a plurality of NDP commands may be provided to a memory device as one packet.

The plurality of NDP commands included in one packet may be assigned to a plurality of NDP engines by an engine scheduler so that a plurality of NDP operations corresponding to the plurality of NDP commands may be performed in parallel.

This can improve the NDP performance compared to the case where an NDP operation for one key, e.g., a first key, is instructed first, and then an NDP operation for another key, e.g., a second key, is instructed after receiving the result of the NDP operation for the first key.

When a plurality of NDP commands are transmitted using one packet, the plurality of NDP commands and their NDP results may be managed by one index or separate indices in each of the command buffer 1250 and the result buffer 1251.

Referring back to FIG. 2, the list type field 201-1 of the NDP control field 201 indicates a type of a data structure managing a plurality of linked lists.

In embodiments, four types of data structures for managing a plurality of linked lists are provided as shown in FIGS. 3 to 6.

Figure 4:
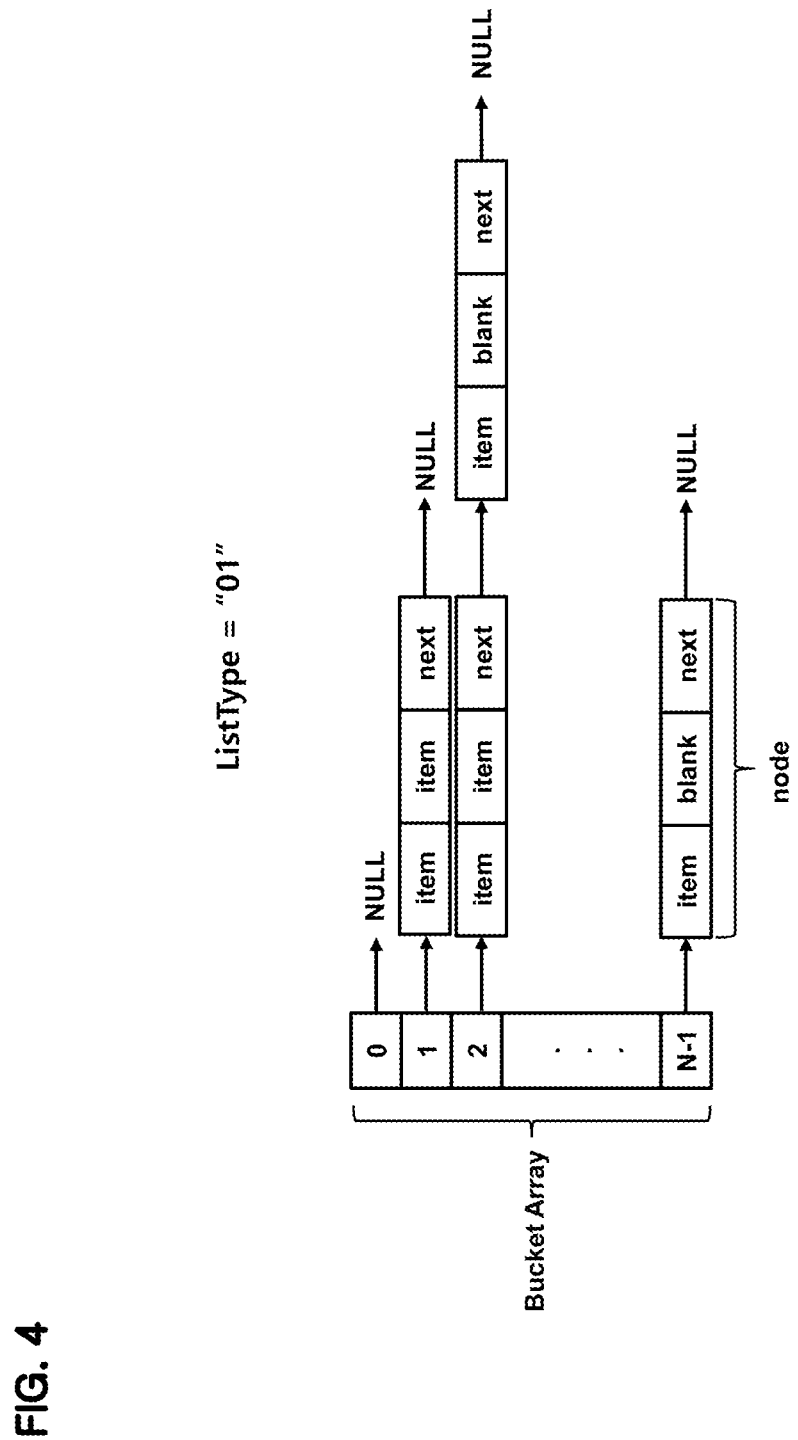
Figure 5:
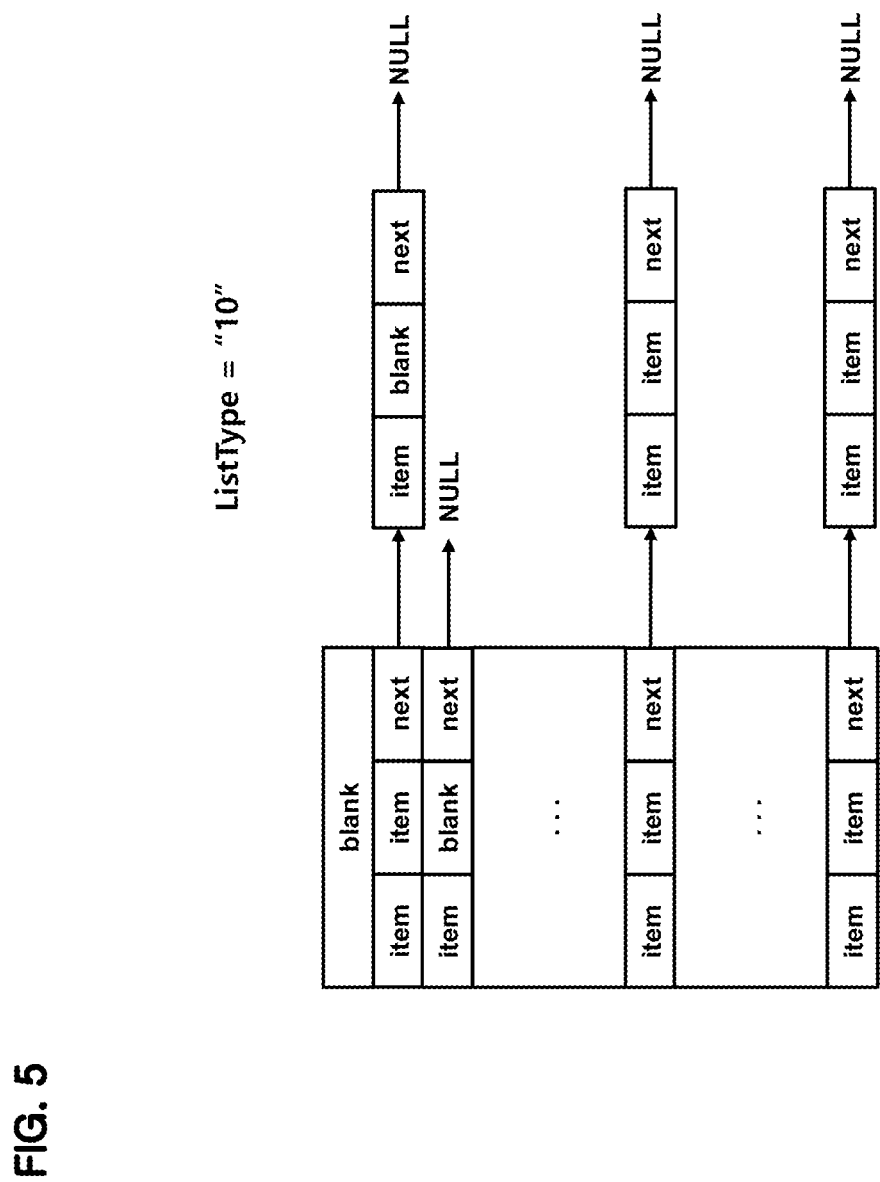
Figure 6:
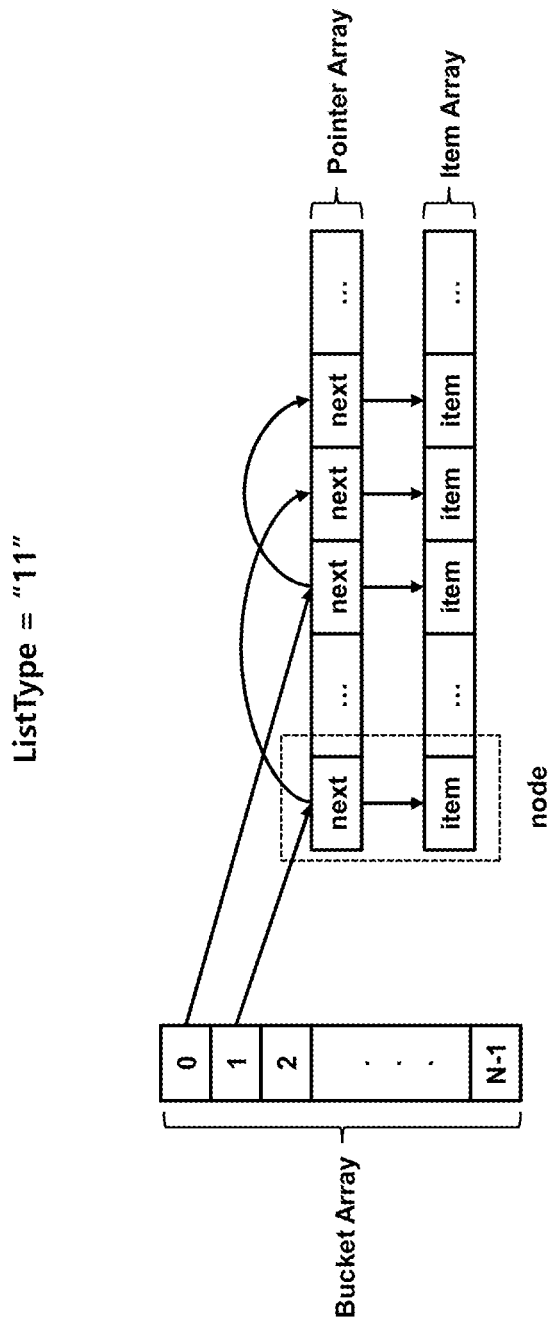

FIG. 3 shows a data structure corresponding to a list type 0, FIG. 4 shows a data structure corresponding to a list type 1, FIG. 5 shows a data structure corresponding to a list type 2, and FIG. 6 shows a data structure corresponding to a list type 3.

Hereinafter, a linked list includes a plurality of nodes, and a node includes data (item) and a pointer pointed to the next node (next).

The data structure of the list type 0 shown in FIG. 3 includes a bucket array and a plurality of linked lists.

The bucket array is an array of pointers, each pointer indicating an address of a start node or NULL of a linked list.

For example, in FIG. 3, since an index 0 of the bucket array indicates NULL, a link list is not allocated. In an index 1, an address of a start node of a link list including one node is allocated. In an index 2, an address of a start node of a linked list including the depth of 2 or two nodes is allocated.

FIG. 4 shows the data structure corresponding to the list type 1. FIG. 4 is different from FIG. 3, in that one node illustrated in FIG. 4 can store an array of items having a certain length. In FIG. 4, if there is an unused space (blank) in an array of a node, a memory space may be wasted.

FIG. 5 shows the data structure corresponding to the list type 2. FIG. 5 does not include a bucket array that includes pointers each designating a linked list. In the list type 2 of FIG. 5, start nodes of linked lists are stored in a certain array region. In this case, a read speed can be improved because the start nodes of the linked lists may not be read from a bucket array. But a memory space may be wasted when the start nodes of the linked lists are scattered in different array regions.

FIG. 6 shows the data structure corresponding to the list type 3. A linked list of the list type 3 is similar to the linked list of the list type 0 in FIG. 3, but items and pointers included in nodes are arranged in separate arrays, e.g., a pointer array and an item array. At this time, each of the pointer array and the item array have a predetermined length, and a pointer and an item at a corresponding index in the pointer array and the item array constitute one node.

As described above, it is preferable that a linked list is stored in adjacent storage spaces, such as memory cells in one memory vault or memory cells in one memory device.

For example, in order to improve the NDP performance, it is preferable that all nodes included in a linked list indicated by the index 2 of the bucket array in FIG. 3 are stored in one memory vault.

For example, in the case of FIG. 6, it is preferable that all nodes of a linked list indicated by the 0th index of the bucket array are stored in one memory vault and all nodes of a linked list indicated by the 1st index of the bucket array are stored in one memory vault.

Figure 7:
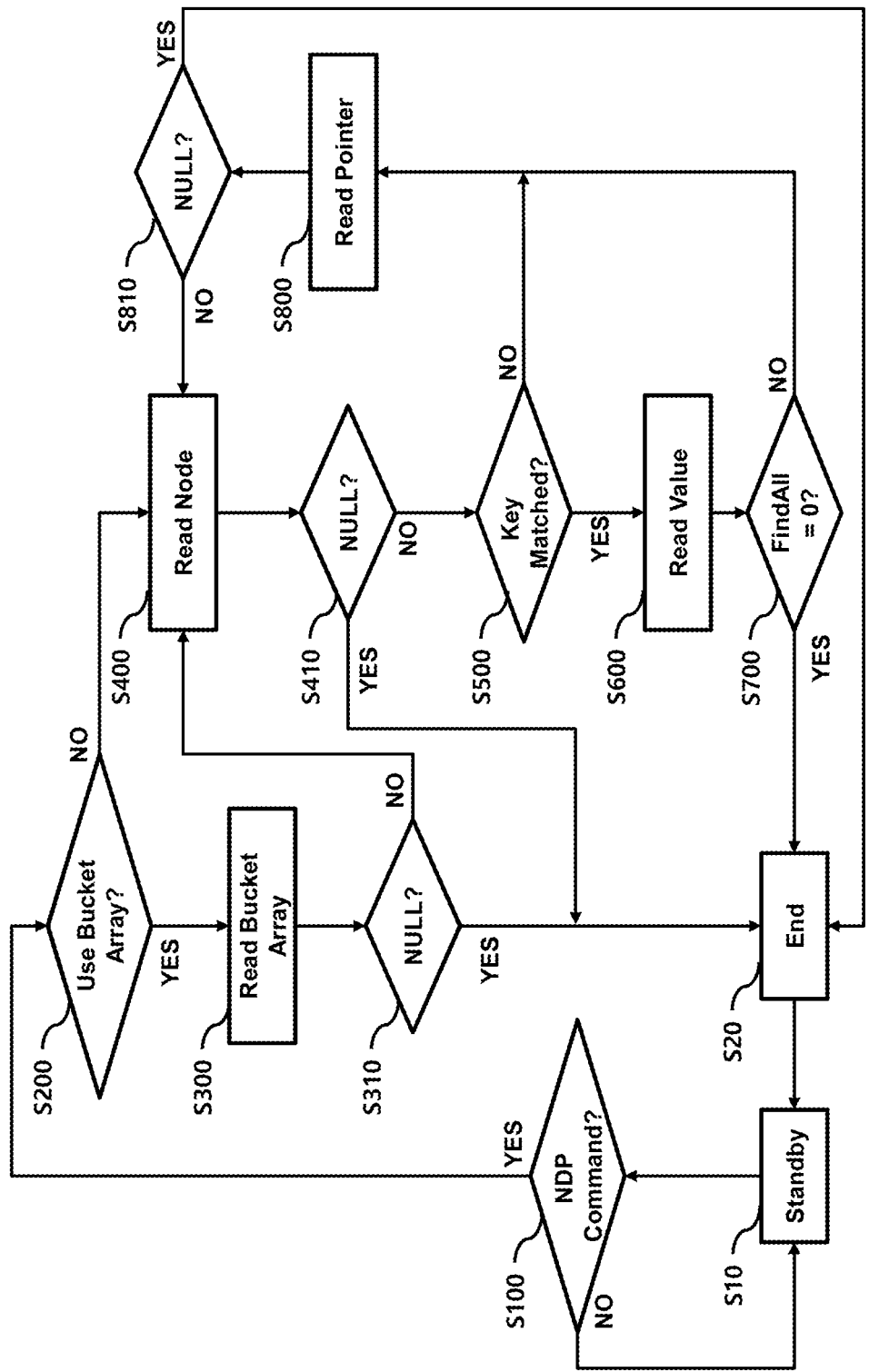
FIG. 7 is a state diagram illustrating a linked list traversal performed by an NDP engine in accordance with an embodiment of the present disclosure.

FIG. 7 is a state diagram illustrating an operation of an NDP engine that performs a linked list traversal.

In FIG. 7, it is assumed that ReturnType information in an NDP command is set to output a value of a node.

The NDP engine is in a standby state at S10, and determines whether the NDP command is input at S100.

If the NDP command is not input, the NDP engine maintains the standby state at S10. When the NDP command is input, the NDP engine starts the NDP operation.

Hereinafter, the NDP operation refers to the above-described linked list traversal.

When the NDP engine starts the NDP operation, it is checked whether a corresponding linked list uses a bucket array at S200.

When the corresponding linked list uses the bucket array, the NDP engine reads the bucket array at S300.

When reading the bucket array, the NDP engine reads a pointer stored in an index in the bucket array, the index of the bucket array corresponding to information in an offset field of the NDP command.

After that, it is checked whether the pointer is NULL at S310. If the pointer is null, the process moves to an end state at S20.

In the end state at S20, an end operation is performed, and the NDP engine stores an NDP result in a result buffer. After the end operation is completed, the process returns to the standby state at S10.

If it is determined that the pointer is not NULL at S310, the NDP engine reads the node at S400, and it is determined whether the node is NULL at S410.

If the node is NULL, the process moves to the end state at S20. Otherwise, an indication of whether a key included in the NDP command is matched to an item of the node is determined at S500.

In an embodiment, an indication of whether the item of the node matches the key of the NDP command may be determined by comparing the item with the key of the NDP command.

In another embodiment, an indication of whether the item of the node matches the key of the NDP command may be determined based on whether a result of mathematically or logically computing the item and the key of the NDP command has a predetermined value.

If the item of the node matches the key of the NDP command, the NDP engine reads a value of the item at S600, and it is checked whether FindAll information in the NDP command is 0 at S700.

As described above, if the FindAll information is 0, the first item matching the key of the NDP command is output. Otherwise, all items matching the key of the NDP command are output.

Accordingly, if the FindAll information is 0, the process returns to the end state at S20 and stores a value of the matched item in the result buffer.

If the FindAll information is not 0, the remaining nodes in the linked list should be traversed.

As described above, in the end operation at S20, the NDP engine stores the NDP result in the result buffer.

In order to traverse the remaining nodes, the NDP engine reads a pointer indicating the next node at S800, and it is checked whether the pointer is NULL at S810.

If the pointer is NULL, the process returns to the end state at S20. Otherwise, the next node is read at S400 and the above-described operation is repeated.

If it is determined that the bucket array is not used at S200, the NDP engine directly reads the node instead of reading the pointer in the bucket array at S400. Thereafter, the above-described operation is repeatedly performed.

Figure 8:
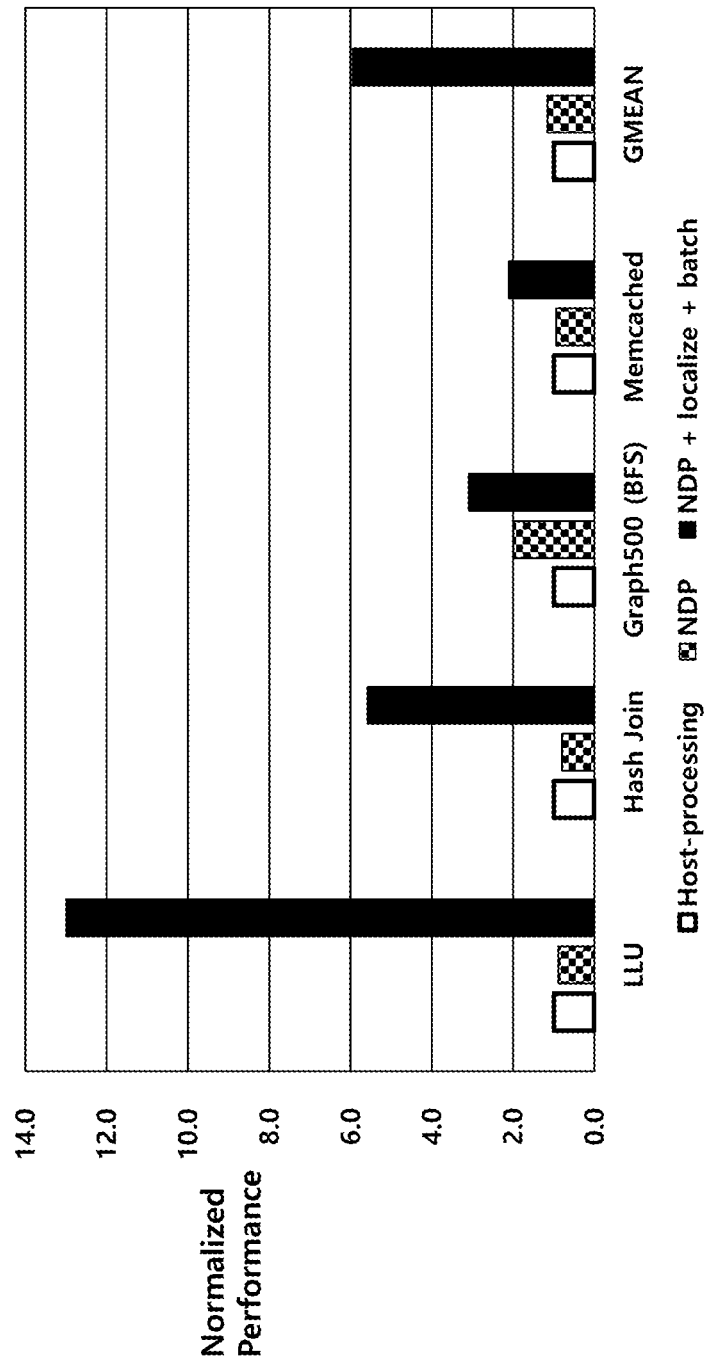
FIG. 8 is a graph illustrating the efficiency of an embodiment of the present disclosure.

FIG. 8 is a graph showing the efficiency of an embodiment of the present disclosure.

In the experiment shown in FIG. 8, 16 memory devices are used.

In the graph, a white bar represents a case where a host processes a linked list traversal, a checkered bar represents a case where a linked list traversal for one key is processed when data is arbitrarily stored, and a black bar represents a case where a linked list is stored in the same memory device and a linked list traversal for two or more keys is provided using a single packet.

In FIG. 8, checkered bar graphs and black bar graphs are normalized based on the white bar graphs.

LLU, Hash Join, Graph500 (BFS), and Memcached, which are shown on the horizontal axis of the graph, indicate types of loads, and GMEAN shows an average of all loads.

As shown in the graphs, an NDP operation (indicated by the checkered bar) shows a certain improvement in the Graph500 (BFS) as compared with the host processing method, which is represented by the white bar.

However, when the linked list is stored in the same memory device and NDP commands for multiple keys are instructed by the single packet, a significant performance improvement is shown at all loads.

Although various embodiments have been described for illustrative purposes, it will be apparent to those skilled in the art that various changes and modifications may be made without departing from the spirit and scope of the invention as defined in the following claims.

What is claimed is:

1. A memory device, comprising:
   a memory cell region including a plurality of memory cells;
   a memory cell controller configured to control read and write operations for the memory cell region;
   a plurality of data processing engines each configured to perform a data processing operation for the memory cell region;
   a command buffer configured to store a plurality of commands transmitted from a host; and
   an engine scheduler configured to schedule the data processing operations for the plurality of data processing engines according to the plurality of commands,
   wherein one of the plurality of data processing engines independently performs a data processing operation while another one of the plurality of data processing engines performs another data processing operation.

2. The memory device of claim 1, further comprising:
   a result buffer configured to store a result of the data processing operation performed by the one of the plurality of data processing engines.

3. The memory device of claim 1, further comprising:
a first path selector configured to selectively connect the plurality of data processing engines to the memory cell controller.

4. The memory device of claim 1, further comprising:
an input/output (I/O) interface configured to transmit a signal between the memory device and an external circuit; and
an internal memory network configured to transmit a signal between the I/O interface and the command buffer.

5. The memory device of claim 4, further comprising:
a second path selector configured to selectively connect the plurality of data processing engines to the internal memory network.

6. The memory device of claim 1, wherein one or more of the plurality of commands are transmitted using one or more packets.

7. The memory device of claim 6, wherein one of the plurality of commands instructs a traversal operation for a data structure stored in the memory cell region, and the one of the plurality of commands includes key information to search in the data structure.

8. The memory device of claim 1, further comprising:
a page table configured to store information on a mapping relationship between a physical address of data stored in the memory cell region and a logical address requested by the host,
wherein the plurality of data processing engines translate addresses by referring to the page table while processing one of the plurality of commands.

9. A memory device, comprising:
a plurality of memory vaults each comprising a plurality of memory cells and a memory cell controller, the memory cell controller configured to control read and write operations for the plurality of memory cells;
a plurality of data processing engines each configured to perform a data processing operation for the plurality of memory vaults;
a command buffer configured to store a plurality of commands transmitted from a host;
an engine scheduler configured to schedule data processing operations for the plurality of data processing engines according to the plurality of commands; and
an internal memory network configured to connect the plurality of data processing engines to the command buffer,
wherein each of the plurality of data processing engines is configured to send a read or write request directly to a corresponding one of the plurality of memory vaults that is coupled to said each of the plurality of data processing engines, or to send a read or write request to one of the other memory vaults than the corresponding memory vault via the internal memory network, and
wherein one of the plurality of data processing engines independently performs a data processing operation while another one of the plurality of data processing engines performs another data processing operation.

10. The memory device of claim 9, further comprising:
a result buffer configured to store a result of the data processing operation performed by the one of the plurality of data processing engines,
wherein the result buffer is connected to the internal memory network, and the result of the data processing operation is provided from the one of the plurality of data processing engines to the result buffer via the internal memory network.

11. The memory device of claim 9, further comprising:
an I/O interface configured to transmit a signal between the internal memory network and the host or between the internal memory network and another memory device.

12. The memory device of claim 9, further comprising:
a page table configured to store information on a mapping relationship between a physical address of data stored in the plurality of memory vaults and a logical address requested by the host.

13. The memory device of claim 9, wherein one of the plurality of commands instructs a traversal operation for a data structure, and the one of the plurality of commands includes key information to search in the data structure.

14. The memory device of claim 13, wherein the data structure is stored in memory cells included in a memory vault among the plurality of memory vaults.

15. A system, comprising:
a plurality of memory devices; and
a host configured to provide a plurality of commands to one of the plurality of memory devices,
wherein each of the plurality of memory devices comprises:
a plurality of memory vaults each comprising a plurality of memory cells and a memory cell controller configured to control read and write operations for the plurality of memory cells;
a plurality of data processing engines each configured to perform a data processing operation for the plurality of memory vaults;
a command buffer configured to store the plurality of commands transmitted from the host;
an engine scheduler configured to schedule the data processing operations for the plurality of data processing engines according to the plurality of commands; and
an internal memory network configured to connect the plurality of data processing engines to the command buffer,
wherein each of the plurality of data processing engines is coupled to one of the plurality of memory vaults and configured to send a read or write request directly to the one of the plurality of memory vaults, or is configured to send a read or write request to a different one of the plurality of memory vaults via the internal memory network, and
wherein one of the plurality of data processing engines independently performs a data processing operation while another one of the plurality of data processing engines performs another data processing operation.

16. The system of claim 15, wherein each of the plurality of memory devices further comprises a result buffer configured to store a result of a data processing operation.

17. The system of claim 15, wherein each of the plurality of memory devices further comprises a page table configured to store information on a mapping relationship between a physical address of data stored in the plurality of memory vaults and a logical address requested by the host.

18. The system of claim 15, wherein the host further comprises a page table configured to store mapping information of page tables included in the plurality of memory devices.

19. The system of claim 15, wherein one of the plurality of commands instructs a traversal operation for a data structure, and the one of the plurality of commands includes key information to search in the data structure.

20. The system of claim 19, wherein the data structure is stored in memory cells included in a memory vault among the plurality of memory vaults.

* * * * *